(12) United States Patent
Farris et al.

(10) Patent No.: US 6,427,010 B1
(45) Date of Patent: Jul. 30, 2002

(54) SYSTEMS AND METHODS FOR PROVIDING VOICE MAIL SERVICES TO PORTED NUMBERS BY SUPPLYING ROUTING INFORMATION VIA SIGNALING NETWORK

(76) Inventors: Robert D. Farris, 114 Goldthorn Way, Sterling, VA (US) 20164; Jeffery A. Gardner, 6313 White Cedar Ct., Eldersburg, MD (US) 21784

( * ) Notice: Subject to any disclaimer, the term of this patent is extended or adjusted under 35 U.S.C. 154(b) by 0 days.

(21) Appl. No.: 09/012,727

(22) Filed: Jan. 23, 1998

(51) Int. Cl.[7] .................................................. H04M 7/00
(52) U.S. Cl. .................................. 379/221.13; 379/88.25
(58) Field of Search ........................... 379/258, 67.1, 379/88.25, 88.22, 88.18, 156, 165, 207.14, 220.01, 221.08, 221.13, 221.14

(56) References Cited

U.S. PATENT DOCUMENTS

| | | | |
|---|---|---|---|
| 4,652,700 A | | 3/1987 | Matthews et al. |
| 5,008,926 A | | 4/1991 | Misholi |
| 5,193,110 A | | 3/1993 | Jones et al. |
| 5,631,948 A | | 5/1997 | Bartholomew et al. |
| 5,661,782 A | * | 8/1997 | Bartholomew et al. ....... 379/89 |
| 5,793,857 A | * | 8/1998 | Barnes et al. ................ 379/207 |
| 5,867,569 A | * | 2/1999 | Martinez et al. ............ 379/207 |
| 5,949,865 A | * | 9/1999 | Fusinato ..................... 379/207 |
| 6,014,379 A | * | 1/2000 | White et al. ................. 370/389 |
| 6,240,296 B1 | * | 5/2001 | Yu et al. ...................... 455/466 |

OTHER PUBLICATIONS

The Bell Atlantic Telephone Companies, FCC1, Section 6.4.1(AG) Jun. 15, 1995.*
Bell Atlantic—New Jersey, Inc., Tariff B.P.U N.J. No. 2, Exchange and Network Services, Jun. 9, 1995, pp. 146.6 to 146.8.

* cited by examiner

*Primary Examiner*—Fan Tsang
*Assistant Examiner*—Nora J Putt

(57) ABSTRACT

A communications system offering telephone number portability services, where a subscriber of a ported telephone number is able to maintain existing voice mail services from an existing end office switching system, independent of the new end office switching system serving the ported telephone number. The end office switching system accessing the voice mail system includes ported number forwarding logic. Using this logic, that office sends a signaling message via a common channel interoffice signaling network. A calling party field of the message specifies the ported telephone number (i.e., the actual called number), instead of the actual calling party number. The end office switching system serving the voice mail system, also referred to as the accessed end office switching system, receives the signaling message, extracts the ported telephone number from the calling party field, and forwards the ported telephone number information to the voice mail system. The information is forwarded to the voice mail system across a data link interface according to a protocol that is independent of any predetermined range of provisioned exchanges.

21 Claims, 8 Drawing Sheets

SYSTEMS AND METHODS FOR PROVIDING VOICE MAIL SERVICES TO PORTED NUMBERS BY SUPPLYING ROUTING INFORMATION VIA SIGNALING NETWORK

BACKGROUND OF THE INVENTION

1. Technical Field

The present invention relates to switched communications networks providing voice mail services, more particularly to a system and method for providing voice mail services to telephone subscribers having ported numbers assigned from one central office to a new central office.

2. Background Art

Voice mail has become commonplace not only in business usage but also on an individual telephone service subscriber basis through service from a central office. A voice mail system is a specialized computer that stores messages in digital form on a disk. The voice is generally digitized, usually at a much slower rate than the 64 Kb/s signal the central office uses in its switching network. The digitized voice is compressed and stored on a hard disk that maintains the voice mail operating system, system prompts, and greetings, and the messages themselves. A processor controls the compressing, storing, retrieving, forwarding and purging of files. A comprehensive review of exemplary voice mail systems and voice messaging systems is disclosed in U.S. Pat. No. 5,631,948 to Bartholomew et al., the disclosure of which is incorporated in its entirety herein by reference.

FIG. 1 is a block diagram illustrating an exemplary voice mail implementing communication system, corresponding to FIG. 5 of the above-incorporated Bartholomew et al. patent. As shown in FIG. 1, at least one switching system 10 is connected to a centralized message service voice mail 20. The switching system 10 may be a local or "end office" type telephone central office switch, such as a 1AESS or 5ESS switch sold by American Telephone and Telegraph.

Structurally, the switching system 10 is a standard central office telephone switch. Each subscriber has at least one piece of customer premises equipment, illustrated as telephone station sets 31 to 33. Local telephone lines 35 to 37 serve as communication links between each of the telephone station sets 31 to 33 and the end office switching system 10. The subscriber station equipment can comprise any communication device compatible with the line. Where the line is a standard voice grade telephone line, for example, the subscriber station equipment could include facsimile devices, modems etc.

The centralized message service or voice mail system in FIG. 1 comprises voice messaging equipment such as a voice mail system 20. Although referred to as "voice" messaging equipment, equipment 20 may have the capability of storing messages of a variety of different types as well as voice messages. For example, a single system 20 may receive incoming messages in the form of audible messages, such as voice messages, as well as text format data messages, image data format (e.g., facsimile) messages, etc. Message service systems having the capability to store messages in a variety of audible, data and image formats are known, see e.g. U.S. Pat. No. 5,193,110 to Jones et al., U.S. Pat. No. 5,008,926 to Misholi and U.S. Pat. No. 4,652,700 to Matthews et al.

The illustrated voice mail system 20 includes a digital switching system (DSS) 21, a master control unit (MCU) 23, a number of voice processing units (VPU's) 25 and a master interface unit (MIU) or concentrator 27. The master control unit (MCU) 23 of the voice mail system 20 is a personal computer type device programmed to control overall operations of the system 20.

Each of the voice processing units 25 includes or connects to one or more digital mass storage type memory units (not shown) in which the actual messages are stored. The mass storage units, for example, may comprise magnetic disc type memory devices. Although not specifically illustrated in the drawing, the voice processing units 25 also include appropriate circuitry to transmit and receive audio signals via T1 type digital audio lines. To adapt the system 20 to receive information other than voice and/or offer services other than voice mail, one or more of VPU's 25 might be reprogrammed to run other types of applications and/or process other types of incoming information. For example, one such unit might process facsimile information, one might process E-mail, etc.

An ETHERNET type digital network 29 carries data signals between the MCU 23 and the voice processing units 25. The Ethernet network 29 also carries stored messages, in digital data form, between the various voice processing units 25. The system 20 further includes T1 type digitized audio links 28 between the DSS switch 21 and each of the voice processing units 25.

The voice mail system 20 connects to the switching system 10 via a number of simplified message desk interface (SMDI) type data lines 41. Specifically, these SMDI links 41 connect between one or more data units (not shown) in the end office switching system 10 and the MIU 27. Each SMDI line 41 carries 2400 baud RS-232 data signals in both directions between the voice mail system 20 and the switching system 10. The MIU 27 is a data concentrator which effectively provides a single connection of as many as thirty-two SMDI lines into the MCU 23 of the voice mail system.

The voice mail system 20 also connects to the end office switching system 10 via a number of voice lines 43 which form a multi-line hunt group (MLHG) between the switch matrix within the switching system 10 and the DSS switch 21 of the voice mail system 20. Typically, the MLHG lines 43 consist of a number of T1 type trunk circuits which each carry 24 voice channels in digital time division multiplexed format.

Calls can be forwarded to the voice mail system 20 in response to calls to subscriber's lines served by the end office switching system 10. When the end office switching system 10 forwards a call to the voice mail system 20, the switching system 10 will also provide various data relating to the call via one of the SMDI links 41 and the MIU 27. In particular, the switching system 10 transmits data to the MCU 23 of the voice mail system 20 indicating which line of the multi-line hunt group 43, i.e. which T1 trunk and which channel on the trunk, that the new call will come in on. The exchange 10 also transmits data via SMDI link 41 identifying the called telephone number and the telephone number of the caller. For a call forwarded to a mailbox, the data from the exchange indicates the reason for the forwarding, and the caller telephone number (typically the directory number assigned to the called subscriber's normal telephone line) identifies which subscriber the forwarded call relates to. The master control unit 23 uses the multi-line hunt group line information and the subscriber's directory number to internally route the forwarded call though DSS switch 21 and one of the internal T1 links 28 to an available voice processing unit 25 and identifies the relevant subscriber to that voice processing unit via the Ethernet 25.

For each party who subscribes to a voice mail service provided by the centralized messaging system 20, the MCU 23 stores information designating one of the voice processing units 25 as the "home" unit for that subscriber. Each voice processing unit 25 stores generic elements of prompt messages in a common area of its memory. Personalized elements of prompt messages, for example recorded representations of each subscriber's name spoken in the subscriber's own voice, are stored in designated memory locations within the subscriber's "home" voice processing unit.

Hence, the voice mail messaging system 20 is configured for receiving forwarded telephone calls for a called party (e.g., subscriber 31) having subscriber profile information stored in the end office switching system 10. Hence, upon detecting a no answer/busy condition on the corresponding line 37, the end office switching system can forward the incoming call to the MLHG 43 and supply the appropriate information associated with the called party across the SMDI link 41 to internally route the forwarded call to the assigned voice processing unit 25 and to identify the relevant subscriber to the voice processing unit 25.

The above-described voice mail systems operate on the assumption that the subscriber is served by an end office switching system 10 having dedicated MLHG 43 and SMDI 41 connections to the voice mail systems 20. Consequently, each SMDI link 41 for an associated end office switching system is assigned a preprovisioned range of exchange codes corresponding to at least a portion of the exchange codes assigned to the end office switching system according to the North American Number Plan (NANP). Hence, if the switching system 10 is assigned the exchange codes 500, 501, 502, 503, 504, the corresponding SMDI link 41 will be provisioned to recognize only those exchange codes (500, 501, 502, 503, and 504) from the end office switching system as valid, identifiable subscribers. The provisioning of a predetermined range of exchanges for the SMDI link 41 enables the MCU 23 to properly identify a subscriber (and appropriate VPU 25) based on the called number information from the SMDI link 41.

The Federal Communications Commission has issued a "FIRST REPORT AND ORDER AND FURTHER NOTICE OF PROPOSED RULEMAKING" document (referred to hereinafter as the FCC document) that contains a description of proposed telephone number portability methods. Number Portability relates to the ability of a telephone service subscriber to select or change the selection of a carrier for providing that customer's local telephone service, while still maintaining the subscriber's telephone number at the same customer premises.

FIG. 2 illustrates a telephone network wherein a customer at station 12 may obtain local exchange telephone service from either a local exchange carrier (LEC) or a competing local exchange carrier (CLEC). In the illustrated example, the customer at station 12, who originally received telephone and voice mail services through the LEC end office 10 and a connected voice mail system 20, has now selected the competing carrier for local service. Accordingly, the station 12 now connects to the CLEC end office 14.

As described above, the voice mail system 20 was configured to identify the called party 12 based on information forwarded by the EO 10 across the SMDI link 41. Assuming the customer at station 12 had a telephone number (703) 502-1234, the SMDI link 41 is provisioned to recognize the 703-502 prefix from the EO 10. However if the station is now connected to the CLEC EO 14 having a 703-999 exchange, then no useful called party information for the station 12 at (703) 502-1234 could be provided by the CLEC EO 14 to the VMS 20.

For example, assume station 1 at EO 17 wanted to call station 12 at (703) 502-1234. After performing a database lookup to identify the CLEC EO 14 as the serving end office, the EO 17 would attempt a call to the EO 14, for example via a tandem office 24. Subscriber profile information within the CLEC EO 14 would cause the CLEC EO 14 to perform a call forwarding function to the VMS 20 upon detecting a busy/no answer condition. A call forwarding on busy/no answer by the CLEC EO 14 to the MLHG 43 via EO 10 would identify MLHG telephone number (703) 502-0000 as the called party via the SMDI link, since the EO 10 would interpret the incoming call from the CLEC EO 14 call as a generic call to the voice mail system. Hence, the generic call to the VMS 20 would require a calling party at station 1 to re-input the called party information.

Moreover, no called party information for the station 12 at (703) 502-1234 could be interpreted by the VMS 20 even if the CLEC EO 14 had its own dedicated SMDI connection to the VMS 20. Assuming the CLEC EO 14 had its own dedicated SMDI connection to the VMS 20, that dedicated SMDI connection would be provisioned with a different predetermined range of exchanges served by the CLEC EO 14 (e.g., 997, 998, 999). Hence, if the CLEC EO 14 forwarded an incoming call intended for station 12 at (703) 502-1234 to VMS 20 and supplied the called number across the dedicated SMDI link, the VMS 20 would be incapable of interpreting the called number (703) 502-XXXX, since called number prefix was not within the predetermined range of exchanges provisioned for the CLEC EO 14. Hence, the VMS 20, incapable of interpreting the 703-502 prefix from the CLEC EO 14 (serving 997, 998, and 999), would route the incoming call to a generic greeting, requiring the calling party to input the called party number.

DISCLOSURE OF THE INVENTION

There is a need for an arrangement that enables a subscriber to utilize telephone number portability features without compromising voice mail messaging features.

There is also a need for an arrangement that enables a voice mail system to receive called party information specifying a voice mail subscriber, having telephone number portability, from an end office that does not have the same provisioned prefix code assigned within the voice mail switch.

There is also a need for an arrangement that enables any end office to forward an incoming call to a personalized greeting in a voice mail system serving a corresponding voice mail subscriber having number portability services, independent of any preexisting prefix code ranges that may have been provisioned within the voice mail system.

There is a further need for an arrangement that enables a subscriber having voice mail services to switch to a competing local exchange carrier with a portable telephone number, without any disruption in voice mail services or features. Such voice mail features include automatic playback of personalized greetings for no answer/busy conditions without requiring a calling party to enter the called party number for identification of the voice mail subscriber by the voice mail system.

These and other needs are attained by the present invention, where a communications system providing number portability provides a signaling and messaging protocol enabling a voice mail system to receive signaling information identifying a called party, independent of the end office switching system serving the called party. The communications system uses a voice mail messaging system having interoffice voice messaging capabilities, where the voice mail messaging system is capable of receiving called party information across a data link interface according to a protocol that is independent of any predetermined range of provisioned exchanges. One exemplary voice mail data link interface is the commercially-available Premier Message Service Interface (PMSI), which enables a first central office serving a connected subscriber to forward a call to a second central office serving the voice mail system, without the necessity of a dedicated data link between the first central office and the voice mail system. Specifically, a voice mail system having a PMSI data link with a central office switching system is able to receive interoffice signaling information received by the central office switching system, independent of the prefix code of the forwarding central office switching system.

The present invention applies the features of PMSI-configured voice mail systems to provide a voice messaging system for messaging number portability, where individual subscribers can use personalized voice messaging services in conjunction with number portability. According to one aspect of the present invention, a communications system includes an originating central office switching system serving a calling station and that is configured to access a database to identify a network address for a serving central office switching system that provides telecommunications services for a called number identified as a ported telephone number. The database may be a localized database within the originating central office switching system, or a centralized database accessed in response to a trigger set in the originating central office switching system. The communications system also includes a voice mail system (VMS)-serving central office switching system that provides line-sided connections and signaling information to a voice mail system according to a prescribed protocol independent of any predetermined range of provisioned exchanges.

The calling station sends a first signaling message to the serving central office switching system, where the signaling message includes the network address of the serving central office switching system within a called number field of the signaling message, and the actual called number (i.e., the ported number) in a supplemental address parameter field. The calling station inserts the network address within the called number field, instead of the actual called number, to supply the first signaling message to the actual central office switching system serving the ported number.

The serving central office switching system, upon recognizing the first signaling message as a terminating attempt to a ported number, will determine availability or busy status of the actual destination station specified in the supplemental address parameter field. The serving central office switching system includes ported number forwarding logic for selectively generating a second signaling message to the VMS-serving central office switching system in response to detecting a condition relating to the ported number requiring forwarding to a voice mailbox serving the called party, for example a no answer/busy condition on the local communication line serving the ported telephone number. The ported number forwarding logic generates the second signaling message by setting the calling field to equal the ported number specified in the supplemental address field, to enable the destination voice mail system to appropriately identify the voice mail subscriber.

Hence, the ported number forwarding logic generates the signaling message to the VMS-serving central office switching system in a manner that enables the VMS-serving central office switching system to identify the voice mail subscriber, enabling playback of a personalized greeting for the calling party.

Another aspect of the present invention provides a communications system where the originating central office switching system includes the ported number forwarding logic to enable the originating central office switching system to directly access the voice mail system of the called party, independent of the capabilities of the central office switching system serving the ported number. The originating central office switching system sends the first signaling message to the serving central office switching system, as described above following a first database access, to determine the availability of the called party at the ported number.

If the originating central office switching system determines from the serving central office switching system that the called party at the ported number is busy, the originating central office switching system sends a second signaling message to the VMS-serving central office switching system based on a second network address from the database access. The second network address for the VMS-serving central office switching system may be obtained during the original database access, or by a second database access in response to detecting the no answer/busy condition. The originating central office switching system also initiates a line-sided connection with the VMS-serving central office switching system, enabling the voice mail system to provide a personalized greeting for the calling party based on the data supplied in the second signaling message.

Hence, the present invention provides an arrangement that enables efficient and economical implementation of voice mail services for subscribers having number portability services. Hence, voice mail subscribers may maintain their personalized voice mail services, independent of the porting of their telephone numbers to different central offices.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

The disclosed embodiments are directed to a communications system offering telephone number portability services, where a subscriber of a ported telephone number is able to maintain existing voice mail services from an existing end office switching system, independent of the new end office switching system serving the ported telephone number. According to the disclosed embodiments, the end office switching system accessing the voice mail system, also referred to as the accessing end office switching system, includes ported number forwarding logic configured for sending a signaling message via a common channel interoffice signaling network. The signaling message has a configuration where a calling party field specifies the ported telephone number (i.e., the actual called number) instead of the actual calling party number. The end office switching system serving the voice mail system, also referred to as the accessed end office switching system, receives the signaling message; extracts the ported telephone number from the calling party field, and forwards the ported telephone number information to the voice mail system. The information is forwarded to the voice mail system across a data link interface according to a protocol that is independent of any predetermined range of provisioned exchanges.

System Overview

Figure 1:
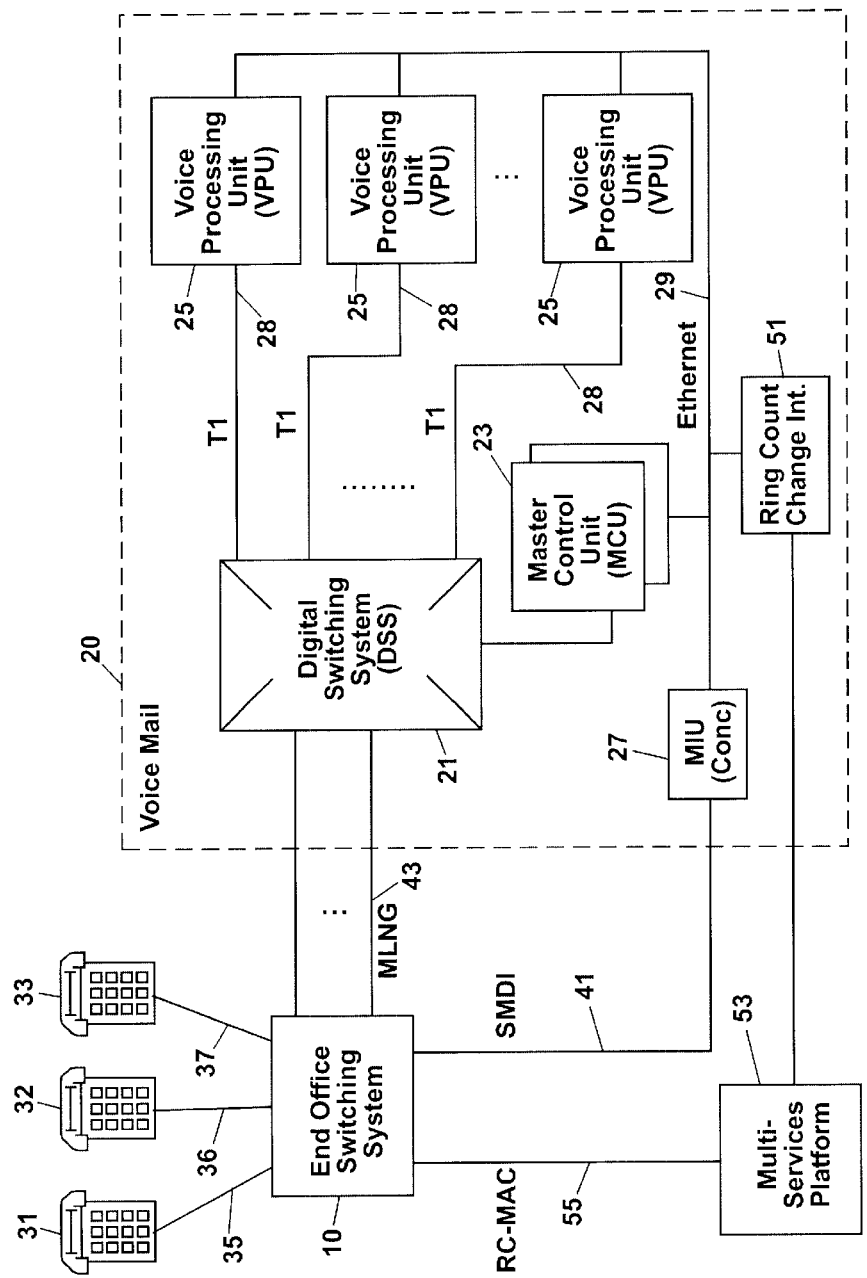
FIG. 1 is a block diagram of a conventional voice mail system connected to an end office switching system.
Figure 2:
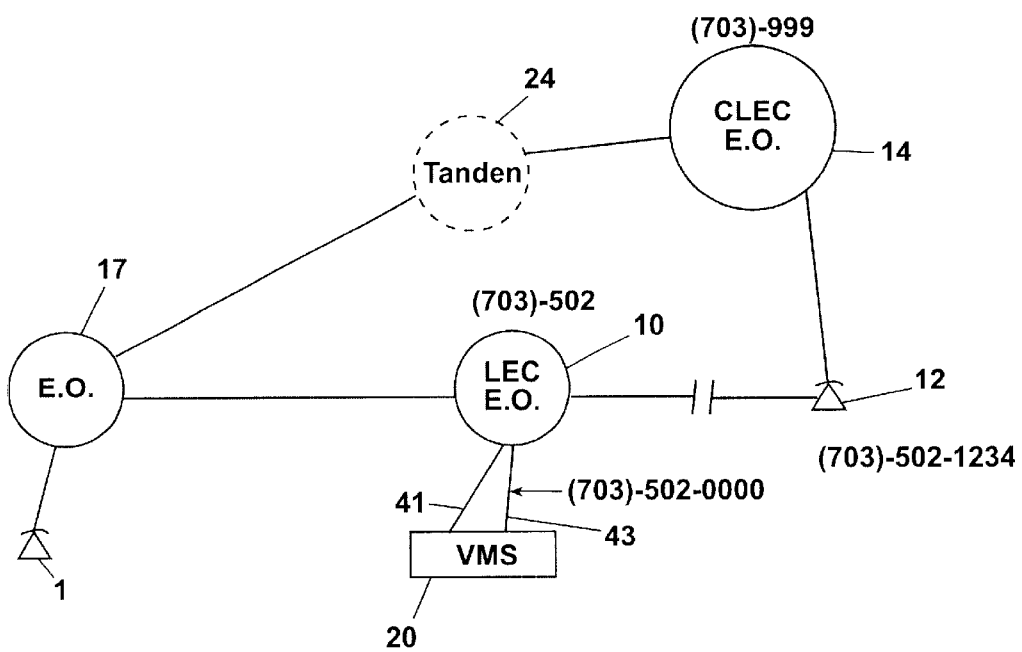
FIG. 2 is a simplified block diagram of a prior art proposal for telephone number portability.
Figure 3:
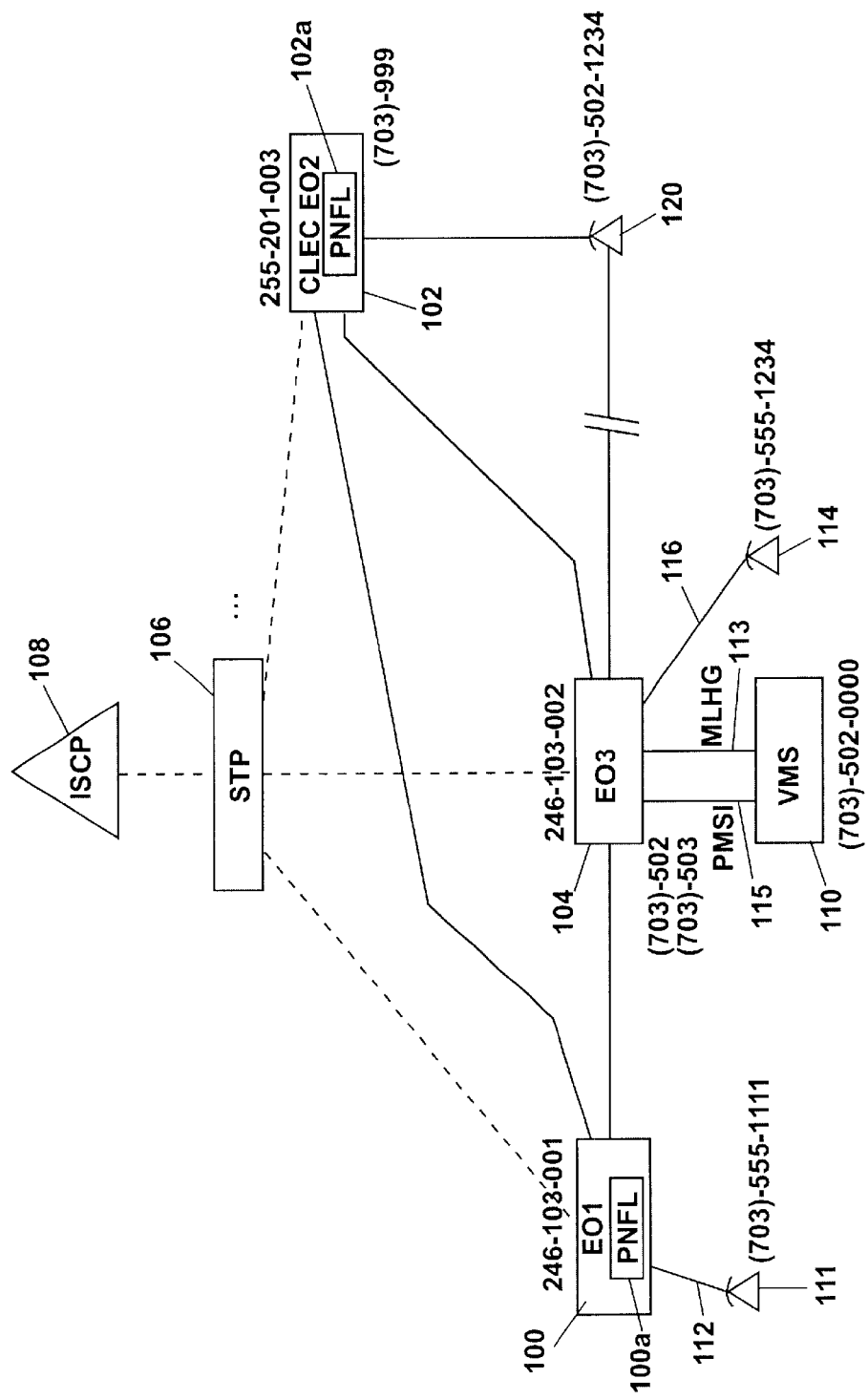
FIG. 3 is a diagram of a communications system for providing number portability and personalized voice mail services for subscribers having ported numbers according to an embodiment of the present invention.

FIG. 3 is a block diagram illustrating a public switched telephone network and the SS7 network that is used to control the signaling for the switched network. The switched telephone network includes a series of central offices which are conventionally referred to as service switching points (SSPs) in reference to the SS7 network, implemented as end offices (EO) 100, 102, and 104. The EO may be a local or "end office" type switch, such as a 5ESS switch sold by AT&T. The switched telephone network may also include one or more tandem offices (not shown). At least one of the central offices 104 serves a voice mail system (VMS) 110 having a multi-line hunt group (MLHG) 113 and a data link 115 for receiving call processing information from the EO 104 according to a protocol that is independent of any predetermined range of provisioned exchanges. According to the disclosed embodiment, the link 115 is a Premier Message Service Interface (PMSI) link, which enables the VMS 110 to use the call related data from the SS7 network to provide subscribers with services such as centralized call coverage and voice messaging functions on an interoffice basis. As described below, the end office 104 forwards information from an SS7 signaling packet to the VMS 110 via the PMSI link 115, enabling the VMS 110 to appropriately identify the voice mail subscriber corresponding to a called, ported number.

SSPs are programmable switches which recognize advanced intelligent network (AIN) type calls, launch queries to an Integrated Services Control Point (ISCP), described below, and receive commands and data from the ISCP to further process the AIN calls. The SSP functionality may reside in an end office such as shown in FIG. 3, or the SSP functionality may reside in a tandem office (not shown), which in turn provides trunk connections to one or more other end offices which lack SSP capabilities. End offices without such functionality route AIN calls to one of the SSP type offices.

Each SSP has a point code comprising a 9-digit code assigned to every node in the SS7 network. For example, EO1 has a point code of 246-103-001, EO2 has a point code of 255-201-103, and EO3 has a point code of 246-103-002. The end offices EO1 and EO3 represent end offices in the region of one regional operating company, also referred to as a local exchange carrier (LEC), while end office EO2 represents an end office of a competing local exchange carrier (CLEC). The point code specifies a network ID, a number specifying a cluster, and a number specifying a member of the cluster (e.g., an SSP) Specifically, each local exchange carrier has its own network ID, shown as 246 for the LEC and 255 for the CLEC. The number 103 in the designation 246-103-001, is the number of the cluster. A cluster can hold 32 SSPs or members, the member being designated by the final 3 numbers. Thus 246 may represent C & P of Virginia Regional Operating Company, cluster 103, member 001 for EO2 when viewed from an SS7 standpoint. The broken lines represent signaling links between the SSPs.

The SS7 network in FIG. 3 comprises a series of Signal Transfer Points (STPs) 106. Each STP in a network is connected to the SSPs by A links. The SS7 network also includes an Integrated Services Control Point (ISCP) 108. In an AIN type network, local and/or toll offices of the public telephone network detect one of a number of call processing events identified as AIN "triggers". A Service Switching Point or SSP type office which detects a trigger will suspend call processing, compile a call data message and forward that message via a common channel interoffice signalling (CCIS) link to the Integrated Service Control Point (ISCP). If needed, the ISCP can instruct the central office to obtain and forward additional information. Once sufficient information about the call has reached the ISCP, the ISCP accesses its stored data tables to translate the received message data into a call control message and returns the call control message to the office of the network via CCIS link. The network offices then use the call control message to complete the particular call. The AIN system offers customers a wide variety of service features and those features can be customized to suit the needs of each customer.

The STP 106 and the ISCP 108 may also be substituted with Intelligent Signaling Transfer Points (ISTPs), described below, which have STP capabilities plus caller profile information. A detailed description of ISTPs is described in U.S. Pat. No. 5,586,177 to Farris et al., the disclosure of which is incorporated in its entirety herein by reference.

The SS7 network is typically used to transport signaling messages between end offices during call setup and tear down. A brief overview of call setup will be provided before describing the signaling messages associated with identifying a subscriber for the voice mail system 110.

SS7 Signaling Protocol

The operation of placing a call from EO1 to EO3 may be described as follows: The subscriber station 111 connected to EO1 via a local communication line 112 picks up his phone and dials the telephone number (e.g., 703503-1234) for a destination station 114 connected to EO3 via a corresponding local communication line 116. As described below, a trigger may be set in the SSP 100 to issue a query message to the ISCP 108 if the exchange 503 corresponds to an exchange that may include ported numbers. Assume for this example that the exchange 703-502 includes ported numbers, and that exchange 703-503 includes no ported numbers. Hence, no trigger is activated for the dialed telephone number 703-503-1234.

The SSP 100 generates an Initial Address Message (IAM). The IAM would have the destination point code of EO3, namely, point code 246-103-002. The IAM would also have an originating point code of EO1, namely, 246-103001, in addition to miscellaneous other information needed for call set-up. That message would then be sent to either directly to EO3 or via STP 106. Assuming that the message goes to STP 106, the STP would look at the message and determine that the message was not for it as an STP but rather is for EO3. The STP 106 would then investigate possible routings to get to EO3, and choose one of the available links.

The SSP EO3 receives the IAM which includes the called telephone number and determines whether or not the line 116 serving the destination telephone number 114 is busy. If the line is not busy, EO3 generates an Address Complete Message (ACM) to indicate that it received the request for a call and that the number is not busy. The ACM message includes a status indicator, typically indicating whether the line associated with the dialed number is available or busy. That message is sent back by simply reversing the point codes. Now the destination point code is EO1 and the originating point code is EO3. The message goes back to EO1 to indicate that the IAM was received and processed.

As soon as the phone is answered at EO3, EO3 sends an Answer Message (ANM) back to EO1 indicating that the phone at EO3 was picked up, and at that time the trunks are connected together. The SSP EO1 then connects its user to the trunk circuit and EO3 connects its user to the trunk circuit so that communication is established. All of the SS7 messaging may occur in about 600 milliseconds, which would be average but not necessarily fast.

Figure 4:
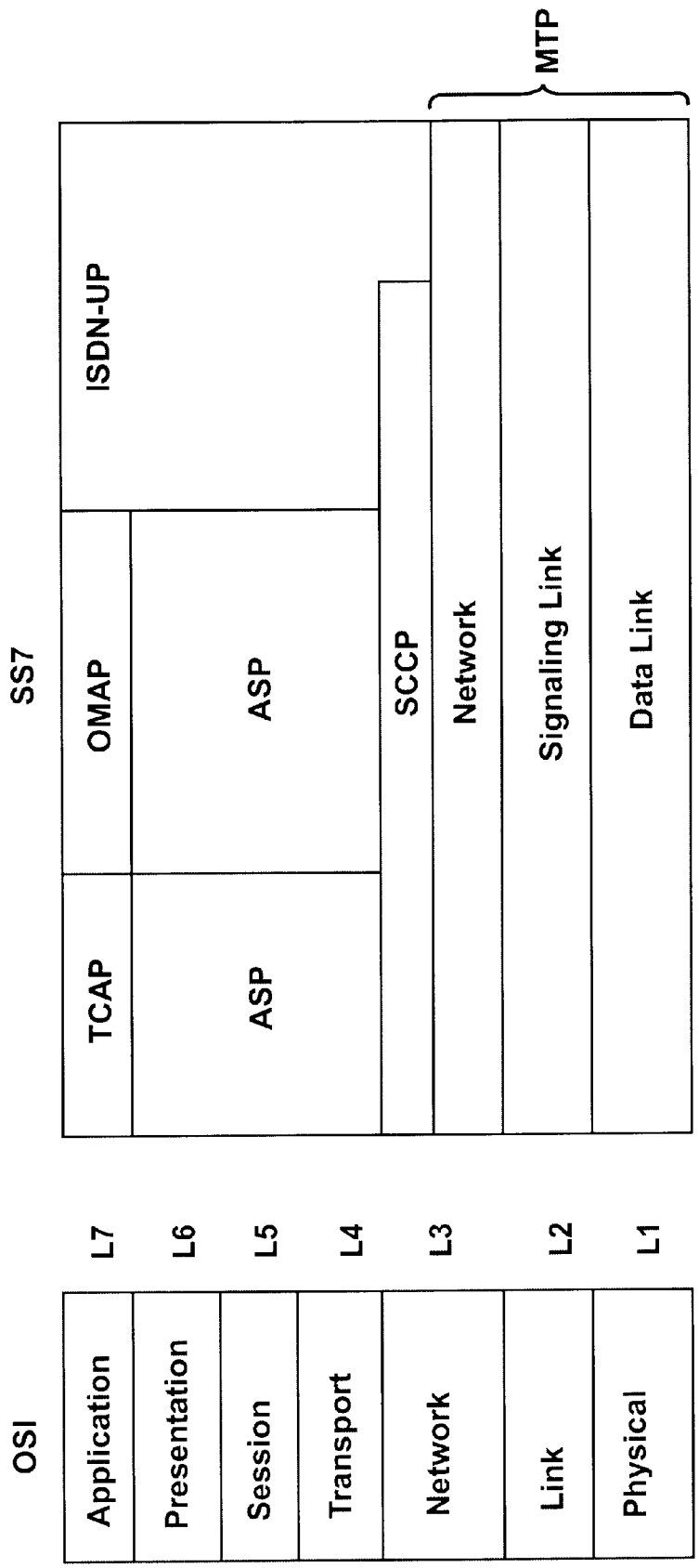
FIG. 4 is a diagram of the protocol stack for SS7 in comparison to the Open Systems Interconnect (OSI) model.

FIG. 4 is a diagram illustrating the SS7 protocol stack compared to the Open Systems Interconnection (OSI) reference model by the International Standards Organization (ISO). The OSI reference model specifies a hierarchy of protocol layers and defines the function of each layer in the network. Each layer in one computer of the network carries on a conversation with the corresponding layer in another computer with which communication is taking place, in accordance with a protocol defining the rules of this communication. In reality, information is transferred down from layer to layer in one computer, then through the channel medium and back up the successive layers of the other computer. However, for purposes of design of the various layers and understanding their functions, it is easier to consider each of the layers as communicating with its counterpart at the same level, in a "horizontal" direction.

The lowest layer defined by the OSI model is the physical layer (L1). This layer provides transmission of raw data bits over the physical communication channel through the particular network. The layer next to the physical layer is the data link layer (L2). The data link layer transforms the physical layer, which interfaces directly with the channel medium, into a communication link that appears error-free to the next layer above, known as the network layer (L3). The data link layer performs such functions as structuring data into packets or frames, and attaching control information to the packets or frames, such as checksums for error detection, and packet numbers. The network layer provides capabilities required to control connections between end systems through the network, e.g. set-up and tear-down of connections.

A transport layer protocol (L4) in the OSI model above the network layer provides control of data transfer between end systems. Above the transport layer, a session layer (L5) is responsible for establishing and managing communication between presentation entities. For example, the session layer determines which entity communicates at a given time and establishes any necessary synchronization between the entities.

Above the session layer, a presentation layer (L6) serves to represent information transferred between applications in a manner that preserves its meaning (semantics) while resolving differences in the actual representation (syntax). A protocol (L7) that is specific to the actual application that utilizes the information communicated runs at the top of the protocol stack.

A detailed explanation of the SS7 protocol may be found in Bell Communications Research, "Specification of Signaling System Number 7," Generic Requirements, GR-246-CORE, Issue 1, December 1994, the disclosure of which is incorporated herein in its entirety by reference. A summary description of the most relevant aspects of SS7 appears below.

For SS7, typical applications layer protocols include Transaction Capability Application Part (TCAP); Operations, Maintenance, Application Part (OMAP); and ISDN User Part (ISDN-UP). TCAP provides the signaling protocols for exchange of non-circuit related, transaction-based information, and has typically been used for accessing AIN databases such as the ISCP or Service Control Points (SCPs) in Advanced Intelligent Networks, described above.

The TCAP protocol specifies the format and content of an initial query message from an SSP to the ISCP and various response messages from the ISCP back to the SSP. Each query and response includes data fields for a variety of different pieces of information relating to the current call. For example, an initial TCAP query from an SSP includes among other data a "Service Key", such as the calling party's address, and the digits dialed by the caller. TCAP also specifies a standard message response format including routing information, such as primary carrier ID, alternate carrier ID and second alternate carrier ID and a routing number and a destination number. The TCAP specifies a number of additional message formats, for example a format for a subsequent query from the SSP, and formats for "INVOKE" messages for instructing the SSP to play an announcement or to play an announcement and collect digits.

ISDN-UP is the actual call control application protocol of SS7. ISDN-UP specifies the procedures for setting up and tearing down trunk connections utilizing CCIS signaling. ISDN-UP messages, for example, include an Initial Address Message (IAM) type query, and Address Complete Message (ACM) and Answer Message (ANM) type response messages.

SS7 specifies an Application Service Part (ASP) for performing the functions of the presentation, session and transport layers for the TCAP and OMAP protocols. The lower four layers of the SS7 protocol correspond to the lower three layers (network, link and physical) of the OSI model. The lower three layers of the SS7 protocol, the network layer, the signaling link layer and the data link layer, form the Message Transfer Part (MTP) of SS7. The MTP is common to messages for all applications and provides reliable transfer of signaling messages between network nodes. The MTP relays messages between applications running at different nodes of the network, effectively like a datagram type service.

The SS7 network layer (lower portion of L3) routes messages from source to destination. Routing tables for the signaling network layer facilitate routing based on logical addresses. The routing functionality at this layer is independent of the characteristics of particular links.

The signaling link layer (L2) performs flow control, error correction and packet sequence control. The signaling data link layer (L1) is the actual physical connection between nodes of the CCIS network. The signaling data link layer in CCIS provides full duplex packet switched data communications. The signaling data link layer element provides a bearer for the actual signaling message transmissions. In a digital environment, 56 or 64 Kbits/s digital paths carry the signaling messages between nodes, although higher speeds may be used.

At the equivalent of the OSI network layer (L3), the SS7 protocol stack includes a Signaling Connection Control Part (SCCP) as well as the network layer portion of the MTP. SCCP provides communication between signaling nodes by adding circuit and routing information to SS7 messages. The SCCP routing information serves to route messages to and from specific applications. Each node of the signaling network, including the various switching offices, transfer points, and databases in each network, is assigned a 9-digit point-code for purposes of addressing signaling messages through the CCIS network. Both the SCCP protocol and the MTP processing utilize these point codes. It will be helpful to consider the format of SS7 messages (FIG. 5) and particularly the routing information contained in each message.

Figures 5, 6:
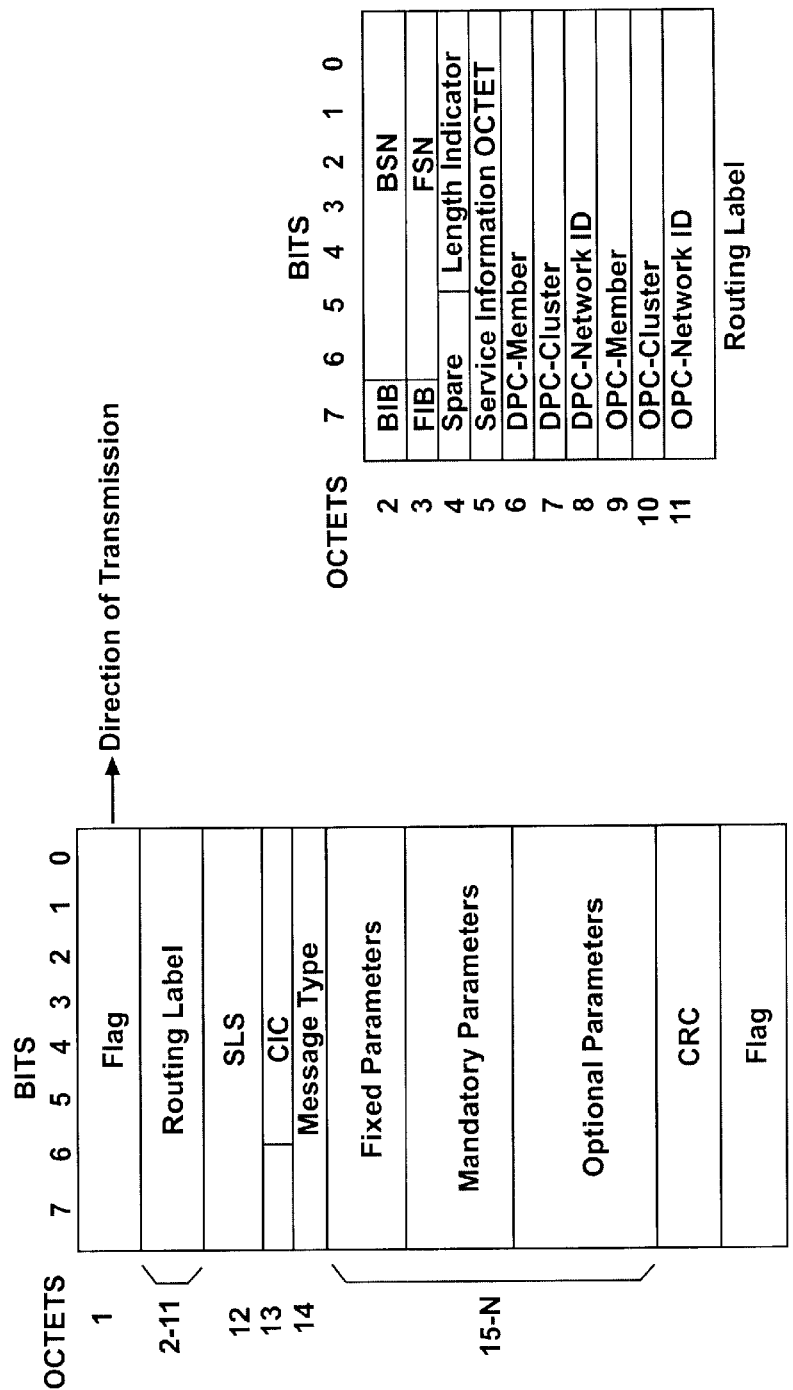
FIG. 5 is a diagram illustrating a layout of an SS7 protocol message packet.
FIG. 6 is a diagram illustrating the layout of the routing label portion of the SS7 protocol message packet shown in FIG. 4.

The SS7 messages traverse the network at all times. The messages themselves comprise digital serial messages that come into the various signaling points. FIG. 5 provides a graphic illustration of an SS7 message packet. The first byte or octet of the message is a flag, which is a zero followed by 6 ones and another 0. This constitutes a unique bit pattern in the SS7 protocol. The protocol ensures that this particular pattern is not repeated until the next message. This provides a flag at the beginning of a new message. A flag at the end of a message is also provided usually in the form of the flag at the beginning of the next message, i.e., a message usually contains only one flag. The message is arranged in 8 bit bytes or octets. These octets represent the information carried by the message. The message contains both fixed and variable parameters. The Message Transport Part (MTP) of the SS7 message is always in the same place. The values change but the MTP is always in the same place.

Octets 2–11 form a routing label as discussed later with regard to FIG. 6. Octet 12 contains a signaling link selection (SLS) byte used to select specific links and/or determine the extent to which the network can select specific links to achieve load sharing. Octet 13 contains a Customer Identification Code (CIC) which typically is used to select an interexchange carrier. Octet 14 contains a message type indicator, and octets 15-N contain the actual message, in the form of fixed parameters, mandatory parameters and optional parameters. The length of the mandatory parameters field and the optional parameters field are variable. There would be 16 other bits that have Cyclic Redundancy Codes (CRCs) in them and another flag which would constitute the end of the SS7 message (and typically the start of the next message). CRCs constitute a further error detection code which is a level 1 function in the protocol.

FIG. 6 is a graphic illustration of the routing label of the SS7 message packet. The first 7 bits of octet 2 constitute the Backward Sequence Number (BSN). The eighth bit is the Backward Indicator Bit (BIB) which is used to track whether messages have been received correctly.

For example, if EO1 in FIG. 3 sends a message to EO3, EO1 includes a Forward Sequence Number (FSN) in the 3rd octet of its message. Upon receiving this message, EO3 will include a Backward Sequence Number (BSN) equal to the FSN sent in the previous message in its next message to EO1. This indicates to EO1 that EO3 received the first message. This constitutes a positive acknowledgment of receipt of a message.

If the eighth bit of the second octet or Backward Indicator Bit (BIB) is inverted, it indicates a failure to receive the identified message. If the 8th bit in the 2nd octet, Backward Indicator Bit (BIB), is inverted, it tells the receiving node that the identified message was not received. The accompanying BSN represents the last message that was received. The receiving node will then invert its Forward Indicating Bit (FIB) 8th bit of the 3rd octet, acknowledging a retransmission remission request, and will begin to send the missing messages until the transmitting end successfully acknowledges all remaining messages, i.e.:

EO1 sends a message with a FSN of 5 to EO3;
EO3 transmits a message back to EO1 with an inverted BIB and a BSN of 2, indicating that was the last message it received;
EO1 then inverts its FIB and retransmits message 3;
If EO3 acknowledges this message correctly (BSN of 3) EO1 will retransmit message 4 and then 5.

Thus between the BIB and FIB and BSN and FSN, the STP keeps track of all of the messages sent between the two nodes at each end of a link. This provides predictability. If a node fails to receive an acknowledgment within a predetermined period of time it will take the link out of service because it is receiving no acknowledgments. This is usually a short period of time such as 1.6 seconds.

Every 8 bits represents another part of the message until the end of the message. At about the fourth octet there is a length indicator to indicate the length of the message. In this case the message is bad in that it indicates six which is not a complete message. Assuming a complete message where the length indicator indicates 23 octets, this provides another means for error detection. Thus if the recipient counts to 28 this indicates that something is wrong and the message is sent again.

Octet 5 is the Service Information Octet (SIO). This indicates whether it is a Fill In Signal Unit (FISU), Link Service Signaling Unit (LSSU) or Message Signaling Unit (MSU). MSUs are the only ones used for setting up calls, LSSUs are used for alignment, and FISUs are fill in signals. The MSU indicator type SIO octet is formatted and encoded to serve as an address indicator, as discussed below.

The routing label includes fields for both destination node related addressing and point of origin node addressing. Specifically, octets 6–11 contain the point codes, where the destination or 'called party' address includes octets 6, 7 and 8. Octets 9–11 carry origination point code (OPC) information, for example member, cluster and network ID information.

In the example shown in FIG. 6, the three octets of the called party node address contain an actual destination point code (DPC) identified as DPC-member, DPC-cluster and DPC-network ID information. In operation, the translation tables stored in a transfer point such as the STP or in an ISTP (described below) cause the transfer point to actually route based on the DPC without translating any of the DPC octets into new values. In the case of an ISTP, the called party address octets (6–8) may carry other types of called party addressing information and receive different treatment by the ISTP. For example, these octets may carry a global title (GTT) and subsystem number (SSN) information. A transfer point utilizes a stored translation table to translate the GTT and SSN into an actual DPC, substitutes that DPC for the information in octets 6, 7 and 8, and then routes the message based on the DPC. As discussed more fully below, under certain circumstances, the ISTP will process application layer information from the SS7 message to determine whether to route or respond to the message. If the ISTP routes the message, the ISTP uses the actual DPC.

To distinguish the types of information carried in octets 6–8, the MSU type service information octet (5) contains an address indicator. For example, a '1' value in the first bit position in this octet signifies that the called party address octets contain a subsystem number, a '1' value in the second bit position in this octet signifies that the called party address octets contain a signaling point code. The third, fourth, fifth and sixth bits of the address indicator serve as the global title indicator and are encoded to identify the presence and type of global title value in octets 6–8.

Additional details regarding SS7 signaling are disclosed in the above-incorporated U.S. Pat. No. 5,631,948 to Bartholomew et al., and in U.S. Pat. No. 5,586,177 to Farris et al., the disclosures of which are incorporated in their entirety herein by reference.

Overview of Number Portability

Number Portability relates to the ability of a telephone service subscriber to select or change the selection of a carrier for providing that customer's local telephone service, while still maintaining the subscriber's telephone number at the same customer premises. Recent legislation and government regulation has mandated that carriers provide local customers with number portability. A number of technical solutions have been considered, and it appears that the industry will implement a technology utilizing a data base look up.

FIG. 3 illustrates a telephone network wherein a customer at station 120 may obtain local exchange telephone service from either a local exchange carrier (LEC) via EO3 or a competing local exchange carrier (CLEC) via EO2. In the illustrated example, the customer at station 120, who originally received telephone and voice mail services through the LEC end office EO3, has now selected the competing carrier for local telephone service, with voice mail services maintained at the LEC end office EO3. Accordingly, the station 120 now connects to the CLEC end office 102. The CLEC end office 102 may connect through trunk circuits to each LEC end office in the area of service or to a trunk connection with an access tandem (not shown). The CLEC end office 102 will also connect into the common channel interoffice signaling network, at least for the exchange of call-setup related signaling messages.

The LEC end office 104 has an assigned area code (NPA) and exchange code (NXX) in accord with the North American Number Plan (NANP). From the range of numbers available with that NPA-NXX code, the subscriber at station 120 served originally by the LEC had an assigned ten-digit telephone number (NPA-NXX-XXXX). For this discussion it is assumed that the LEC end office 104 services the area code and exchange codes of 703-502 and 703-503, and that the customer at station 120 had a telephone number of 703-502-1234.

The CLEC end office 102 similarly will be assigned an NPA-NXX. In the illustrated example, it is assumed that the CLEC end office 102 has an NPA-NXX of 703-999. A new customer of the CLEC who does not retain a previously assigned number will receive a new telephone number including that NPA-NXX. Such customer, for example, may have changed premises. When a customer of an LEC decides to change existing premises local service to the CLEC, as depicted in FIG. 3 by the broken line between the LEC end office 104 and the subscriber station 120, the customer will be able to take or 'port' the existing number over to the CLEC. Such customer must be able to receive incoming calls dialed to the old NPA-NXX-XXXX (703-502-1234) number through a CLEC switch 102 having a different NPA-NXX (703-999), notwithstanding that the 703-502 code is not assigned to the CLEC office 102.

One proposed implementation involves querying a routing database by the originating office 100, that serves calling party station 111, for all calls to any NPA-NXX from which any number(s) has been ported. With such implementation, such a query will not be made for a call only if the NPA-NXX of the called party is an exchange which has had no ported numbers. For ported numbers, the database responds to the query by providing a Local Routing Number (LRN), for use in routing the calls to the correct CLEC end office 102. For number portability, one number in the range of numbers assigned to the CLEC end office 102 is designated as a local routing number (LRN).

Figure 7:
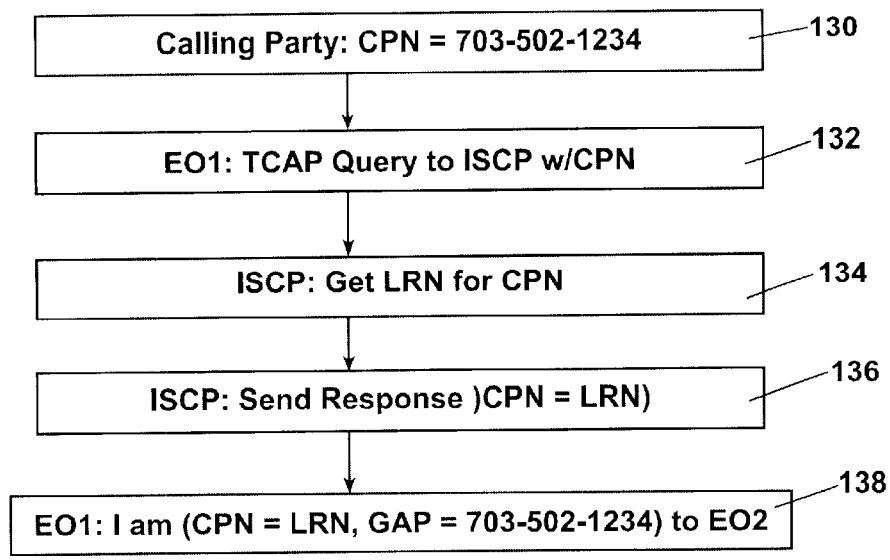
FIG. 7 is a diagram illustrating the flow of signaling messages used for call processing of a ported number.

FIG. 7 is a diagram illustrating the exchange of signaling messages used to set up an inter-office call to a ported number using the basic LRN methodology. It is assumed that a caller at station 111 dials the ported telephone number 703-502-1234 in step 130. In the originating end office 100, a trigger has been set against the NPA-NXX codes (502 and/or 703-502) for the LEC end office 104. Detection of the dialing of the 502 code therefore triggers AIN processing by the end office 100. The end office 100 suspends call processing and launches a Transaction Capabilities Applications Protocol (TCAP) query in step 132. The TCAP query goes through a signaling transfer point (STP) 106 to the Integrated Services Control Point (ISCP) 108. The TCAP query includes a variety of data fields that contain information about the call. One such field in the query is the called party number field (CPN). In the initial query to the ISCP 108, the CPN field contains the dialed number (502-1234 or 703-502-1234).

The ISCP 108 will have a table that has an entry for each ported number. The table will have no entries for non-ported numbers. Each entry contains the LRN of the CLEC that corresponds to the ported number. In the example shown in FIG. 3, it is assumed that the LRN for the CLEC end office 102 is 703-999-9999. In response to the TCAP query, the ISCP extracts the CPN and accesses the table based on the extracted CPN to translate 703-502-1234 into 703-999-9999 in step 134. The ISCP then formulates a TCAP response message based on the number translation with the LRN (703-999-9999) placed in the CPN field of the response. The ISCP 108 transmits the response message back through the STP 106 to the originating end office 100 in step 136. Upon receipt of the response message, the end office 100 resumes its processing of the call. Based on the information contained in the response message, the call is routed by the EO1 100 to the LRN of the terminating CLEC office 102. This office 102 then completes the connection of the call to station 120.

Routing of the call to the CLEC end office 102 includes a transmission and reception of a number of SS7 protocol interoffice signaling messages by the originating end office 100. The first of these messages is an Initial Address Message (IAM) transmitted from the originating end office to the terminating end office 102 in step 138. For a ported number call, the IAM message will contain the LRN (703-999-9999) in the CPN field. The IAM message also includes a generic address parameter (GAP) field. The originating end office 100 places the actual destination number (703-237-5432) in the GAP field of the IAM, for each call to a ported number as indicated by the presence of an LRN in the response from the ISCP 108. The originating end office 100 also sets the m-bit in the forward call indicator parameter of the IAM to '1', to indicate to any subsequent switch in the call path that the number portability query has already been completed for this call.

The CLEC end office 102 will recognize the IAM message with the LRN in the CPN field as a message relating to a call to a ported number. Therefore, the CLEC end office 102 will utilize the number in the GAP field as the actual destination number. After the IAM message, the CLEC end office 102 will process the call in the normal manner to determine availability or busy status and ring and complete the call to the station 120 if available.

If station 120 is busy or not available, the CLEC end office 102 includes portable number forwarding logic (PNFL) 102*a* that enables the incoming call from the EO1 100 to be forwarded to the MLHG 113 of the VMS 220. Specifically, the PNFL 102*a* generates an SS7 signaling message enabling the VMS 110 to receive the ported number across the PMSI link 115 to identify the called party's mailbox, described below with reference to FIG. 8A. Alternatively, the originating office EO1 100 includes portable number forwarding logic (PNFL) 100*a* to initiate a call to the called party's mailbox across the PMSI link 115, described below with reference to FIG. 8B.

In the above example the caller at station 111 has dialed a ported number. If, instead, the caller had dialed a non-ported number that is still being served by the LEC office 104, the ISCP query would still take place because the dialed NXX is associated with LEC 104 from which at least one number has been ported out. For example, if a caller at station 111 dials 502-1111, a number of a station that is still served through the LEC CO 104, the originating end office 100, triggered by the 502 NXX, would formulate the query and send the query to the ISCP 108, exactly as in the above example of a call to a ported number. However, in this case, the ISCP will not have a listing because the called party number (703-502-1111) has not been ported over to a CLEC. The ISCP therefore would send a response back that includes the dialed number (703-502-1111) in the CPN field. The completion of the call to the non-ported telephone number will have been delayed by the time necessary to query the ISCP 108 and obtain a response. The use of the LRN call processing in this case degrades the service for calls to non-ported telephone numbers.

If the caller calls a number that normally resides within the exchange that serves the calling party, the internal switch translations will determine how the call is routed. For example, if a caller at a station served by LEC 104 dials a call to a station at 502-1111, the LEC end office 104 utilizes its internal translations stored in internal databases. If the switch still provides telephone service for that number, the end office 104 completes the call in the normal manner. If the call is to a ported number, such as 502-1234, then the switch translation will provide the LRN (e.g. 999-9999). The end office 104 then routes the call through the CLEC end office 102 using the LRN as the CPN and using the destination number as the GAP, in the same manner as for the exemplary call from station 111 to station 120 discussed above. For such call, however, communication with the ISCP for a data base lookup will not be necessary.

One variation to the basic LRN routing methodology outlined above, referred to as "Query on Release," involves the originating end office switch transmitting a normal IAM message to the end office corresponding to the NPA-NXX of the dialed number on all intra-office calls. For example, if the caller at station 111 dials 502-1234 or 502-1111, the end office 100 transmits an IAM message to the LEC end office 104. For the non-ported number, e.g. 502-1111, the call is processed and completed in the normal manner with no additional signaling or delays. For a call to the ported number, the LEC end office 104 sends an SS7 release message back to the originating end office 100. A release message includes a 'cause' code. For example, in normal call processing the cause code in a release message might indicate that the line to the called number is busy. For number portability service, the cause code would indicate that the LEC end office 104 does not service that number, i.e. that the called number has been ported to a competing carrier.

The receipt of a release message with the ported number 'cause' indicator would trigger AIN processing in the originating end office 100. The originating end office switch 100 would query the ISCP 108 and receive the LRN for the CLEC end office 102 and the end offices route the call to the destination, in precisely the same manner as in the basic LRN processing discussed above.

Another variation utilizes essentially an AIN based call forwarding type process. This involves routing the calls to the LEC end office that services the dialed NPANXX. A terminating trigger is set in that end office against each number actually ported out of that office to a competing carrier's end office. For non-ported number calls, the LEC end office 104 completes the calls in the normal manner. For calls to ported numbers, however, the end office 104 would suspend call processing and obtain the LRN from the ISCP 108. The end office 104 would complete each ported number call through the CLEC end office 102 using the LRN, in a manner similar to the basic LRN processing discussed above.

The use of a terminating attempt trigger in the donor end office 104 eliminates the unnecessary querying to the ISCP 108 for calls to non-ported numbers. Also, the terminating attempt trigger is an existing trigger supported by the present AIN switch software. The LEC thus would not have to purchase an expensive new software upgrade for each end office switch in the LATA in order to support number portability. This AIN based call forwarding approach also keeps the LEC end office 104 in the call routing path for calls to ported numbers.

Figure 8A:
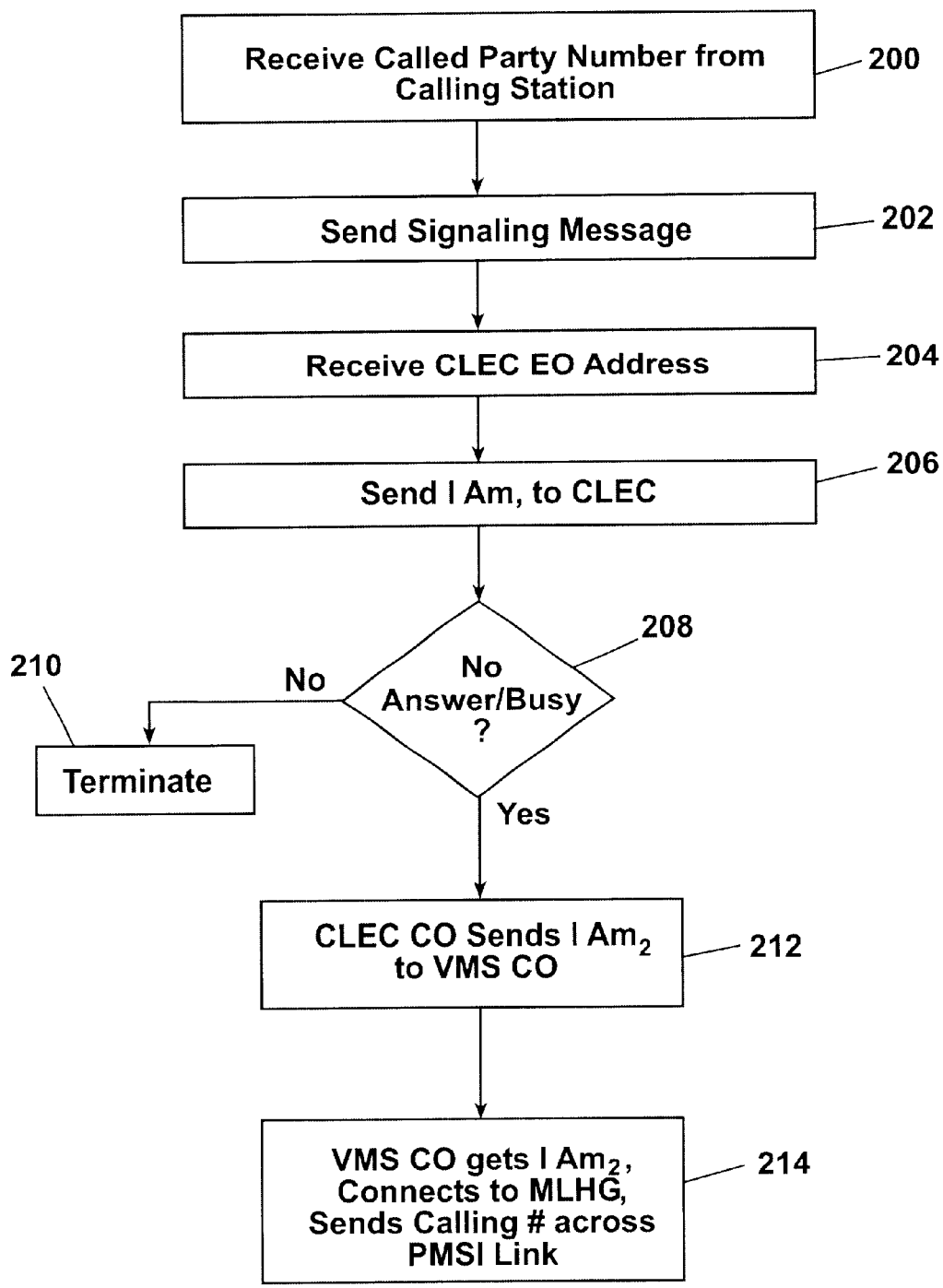
FIGS. 8A and 8B are flow diagrams illustrating alternative methods for forwarding a call intended for a ported number to a serving voice mail system according to respective embodiments of the present invention.
Figure 8B:
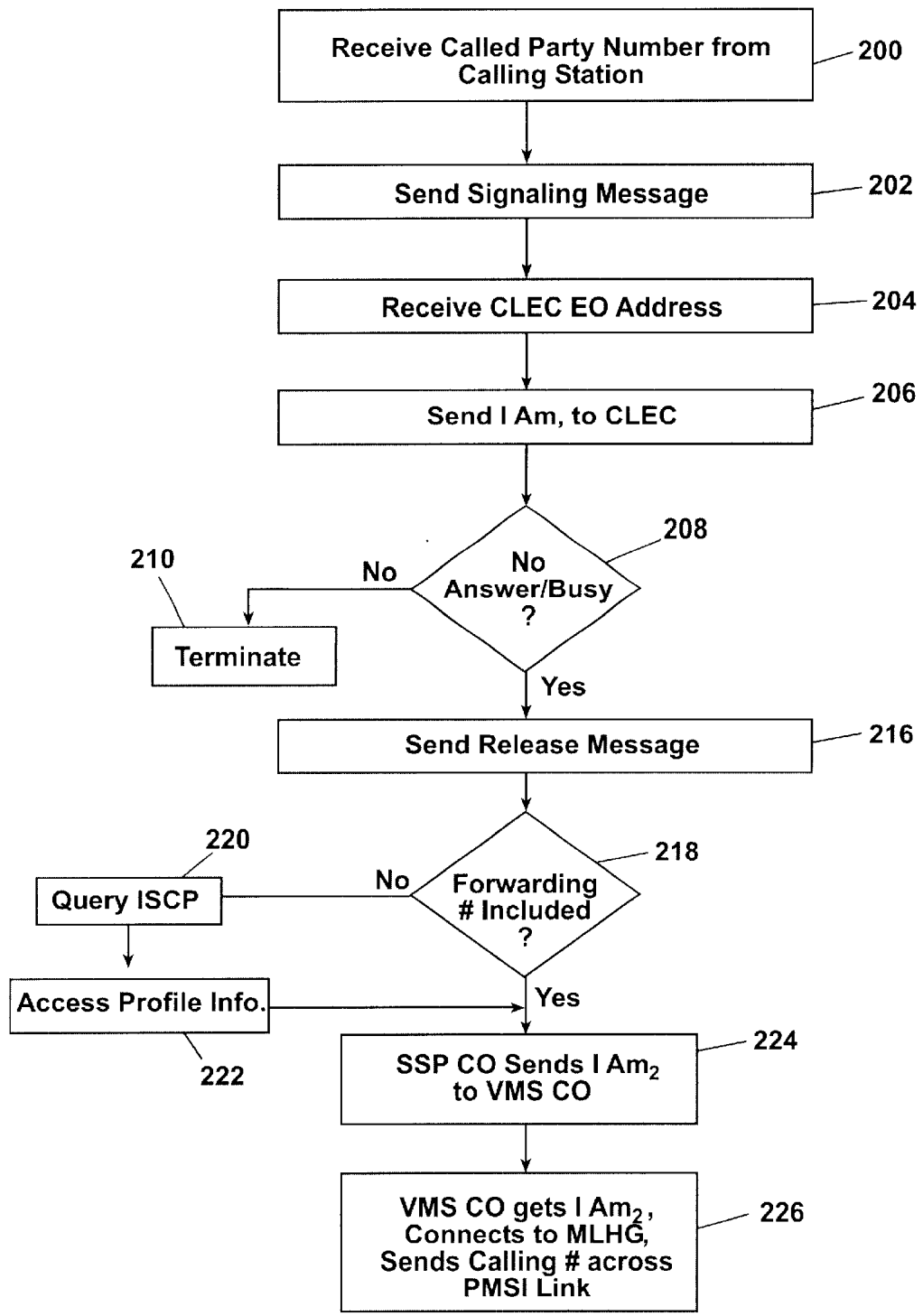

Voice Mail Call Processing for Number Portability FIGS. 8A and 8B are flow diagrams illustrating alternative call processing methods for forwarding an incoming call intended for a ported telephone number to a personalized voice mail system according to an embodiment of the present invention. FIG. 8A discloses one arrangement where the call forwarding operation is performed by the PNFL 102*a* of CLEC EO 102 to the voice mail system 110 in response to a detected no answer/busy condition for the ported number at station 120. FIG. 8B discloses an alternative call processing arrangement where the PNFL 102*a* of the originating central office switching system 100 directly accesses the voice mail system of the called party in response to receiving a signaling message from the central office switching system 102 indicating the station 120 at the ported number is unavailable.

As shown in FIG. 8A, the method begins in step 200, where the originating end office 100 receiving the telephone call from the station 111 receives the called party number from the calling station 111. Upon receiving the called party number from the calling station 111, the end office 100 sends a signaling message to obtain the network address (e.g., the LRN) for the central office switching system serving the called number in step 202. As described above, the signaling message may be in the form of a TCAP query message to the ISCP 108, which accesses its internal call processing records and returns the network address for the CLEC 102 to the end office 100. Alternatively, the end office 100 may send an IAM to the SSP 104 corresponding to the NPA-NXX of the dialed number, after which the SSP 104 may obtain the LRN from internal translation tables or the ISCP 108 in response to a terminating attempt trigger. Alternatively, the SSP 104 may return a "cause" code indicating the LEC end office 104 does not service that number, causing the end office 100 to query the ISCP 108 for the local routing number.

Regardless of the various implementations for obtaining the local routing number, the SSP 100 will receive the CLEC end office address for the office serving the ported number, for example as a local routing number (LRN) in step 204. Upon receiving the CLEC address in step 204, the SSP 100 sends an IAM to the CLEC 102 in step 206 using the message structure in FIG. 9. Specifically, the IAM 300 includes a calling number field 302, a called party number (CPN) field 304, and a generic address parameter (GAP) field 306. The IAM message 300 sent by the originating end office 100 includes the telephone number of the station 111 (i.e., 703-555-1111) in the calling party field 302, the network address (e.g., LRN) of the CLEC EO 102 in the CPN field 304, and the ported telephone number (e.g., 703-502-1234) in the GAP field 306.

The CLEC end office 102, upon receiving the IAM 300, determines that the IAM corresponds to a ported number, and reads the ported number from the GAP field 306. The CLEC end office 102 accesses its internal translation tables to determine the end office equipment number assigned to the ported telephone number (703-502-1234), and detects in step 208 if the telephone station 120 is either busy or has a no answer condition to determine if forwarding is required to the voice mailbox serving the called party of the ported number. If the CLEC EO 102 determines that the line is available, for example by detecting an off-hook condition within a prescribed interval, then the CLEC EO 102 terminates the call in step 210.

Figure 9:
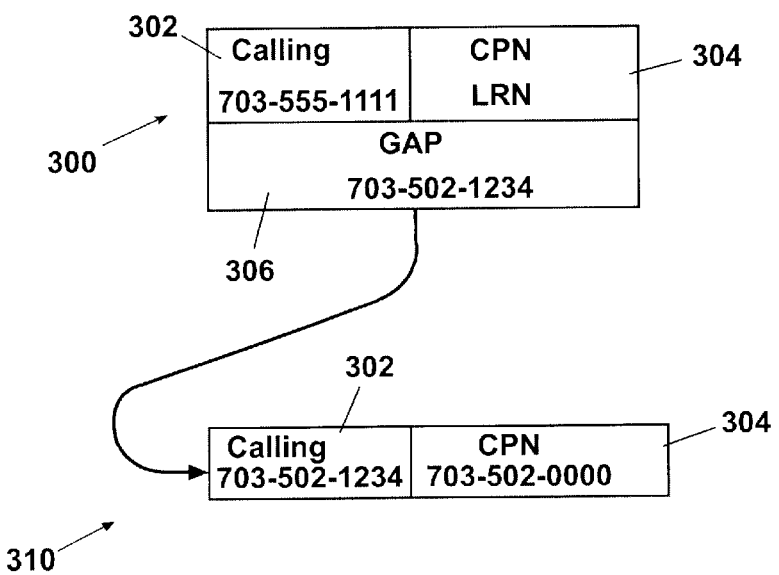
FIG. 9 is a diagram illustrating signaling messages sent to the voice mail system in FIG. 3 during the call forwarding routing of FIGS. 8A and 8B.

If in step 208 the CLEC EO 102 determines forwarding is required, e.g., detects a no answer/busy condition on the line serving the ported telephone number, the CLEC EO 102 uses the PNFL 102a to generate a second IAM message 310, shown in FIG. 9, to the end office 104 serving the VMS 110 in step 212. Instead of generating the conventional forwarding IAM message by using the CPN 304 of the received message 300 for the calling number field in the second IAM message, the logic 102a formulates the IAM by placing the ported number from the GAP field 306 of IAM 300 into the calling party field 302 of the IAM 310 as shown in FIG. 9. The logic 102a also places the telephone number for the multi-line hunt group 113 (e.g., 703-502-0000) in the CPN field 304 of the second IAM message 310.

Upon receiving the second IAM message 310, the SSP 104 extracts the calling and called party information from the respective fields 302 and 304, couples the line-sided connection to the multi-line hunt group 113, and forwards the calling party information (e.g., the ported number) across the PMSI link in step 214, enabling the VMS 110 to identify the voice mail subscriber and couple the call from station 111 to the personalized voice mailbox for station 120.

FIG. 8B is a variation of FIG. 8A, where the originating end office switch 100 sends the second IAM to the central office 104 serving the voice mail system 110. Specifically, steps 200 through 210 are the same as in FIG. 8A. However, if in step 208 the CLEC end office 102 detects a no answer/busy condition, the CLEC EO 102 sends a release message including a cause code to the originating end office 100, indicating that the line is busy, or indicating a no answer condition after a prescribed interval in step 216. The release message may also include the forwarding telephone number for the multi-line hunt group 113 of VMS 110.

In response to receiving the release message, the originating end office 100 checks if a forwarding number is included in the release message in step 218. Assuming no forwarding number is present, the end office switch 100 may generate a TCAP query message to the ISCP 108 in step 220, where the ISCP 108 may be configured to include voice mail forwarding information in the subscriber call profile records. Upon receiving the TCAP query message, the ISCP 108 accesses the internal subscriber profile information in step 222, and forwards the TCAP response back to the SSP 100. Once the SSP 100 obtains the forwarding number (either as included in the release message or after subsequent access of the ISCP), the PNFL logic 100a of SSP 100 generates a second IAM message to the serving SSP 104 in step 224. The IAM message output by the SSP 100 is of the same format as the IAM message 310 of FIG. 9.

Upon receiving the IAM message 310 from the end office 100, the SSP 104 connects the calling party 111 to the multi-line hunt group 113, and forwards the signaling information over the PMSI link 115 in step 226 to enable the VMS 110 to play a personalized message by the subscriber at station 120 for the calling party at station 111.

According to the disclosed embodiments, end office switching systems include portable number forwarding logic that enables the end office switching system to send a signaling message via a common channel interoffice signaling network to a voice mail system, where the calling party field in the signaling message specifies the ported telephone number. Hence, a signaling point (e.g., a serving end office) for the voice mail system extracts the ported telephone number from the calling party field, and forwards the ported telephone number information to the voice mail system, enabling the voice mail system to access the appropriate subscriber profile information to provide a personalized greeting for the incoming telephone call. The ported telephone number is sent across a data link interface according to a protocol independent of any predetermined range of provision exchanges (e.g., PMSI), enabling the voice mail system to serve any ported number, regardless of the prefix code assigned that ported number.

As described above, different translation routines and/or database lookup arrangements may be used for number portability, so long as the forwarding signaling message to the voice mail system includes the actual ported number according to a protocol that enables the voice mail system to retrieve the ported number to identify the appropriate personalized greeting for the incoming call.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. In a switched communications network comprising:
a first central office switching system serving a calling party,
a second central office switching system serving a called party having a ported number,
a third central office switching system serving a voice mail system, and
an interoffice signaling system,
a method comprising:
receiving the ported number from the calling party in the first central office switching system;
determining in the first central office switching system a network address of the second central office switching system based on a translation table access using the ported number;
detecting in the second central office switching system a condition relating to the ported number requiring forwarding for a voice mailbox of the called party;
sending a first signaling message via the interoffice signaling system to the third central office switching system including the ported number;
establishing a switched communication link for the calling party through the third central office switching system to the voice mail system;
supplying the ported number to the voice mail system; and
providing the calling party communication with the voice mailbox for the called party in the voice mail system, based on the ported number supplied to the voice mail system.

2. The method of claim 1, wherein the network address determining step comprises:
sending a query message including the ported number to an external database via the interoffice signaling network;
accessing the translation table in the external database based on the ported number and in response retrieving the network address of the second central office switching system; and
sending a message, having the network address of the second central office switching system, to the first central office switching system via the interoffice signaling network.

3. The method of claim 2, wherein:
the determining step further comprises detecting a trigger in the first central office switching system based on an exchange prefix of the ported number;
the query message sending step is performed by the first central office switching system; and
the step of sending a message to the first central office switching system is performed by the external database.

4. The method of claim 2, further comprising:
sending a second signaling message to one central office switching system serving the exchange prefix of the ported number;
detecting in the one central office switching system the ported number to be a ported number, the query message sending step comprising sending the query message from the one central office switching system; and
receiving in the one central office switching system a reply from the external database based on the query message, wherein the one central office switching system performs the step of sending a message to the first central office switching system.

5. The method of claim 2, wherein the network address of the second central office switching system specifies a Local Routing Number (LRN) of the second central office switching system.

6. The method of claim 1, wherein the network address determining step comprises:
sending a second signaling message including the ported number to one central office switching system serving the exchange prefix of the ported number;
accessing the translation table in the one central office switching system based on the ported number in the second signaling message; and
sending from the one central office switching system to the first central office switching system a third signaling message including the network address.

7. The method of claim 6, wherein the network address is a Local Routing Number for the second central office switching system.

8. The method of claim 1, wherein the detecting step comprises:
receiving a second signaling message from the first central office switching system including the ported number;
identifying a local communication line serving the ported number; and
detecting the condition of the local communication line serving the ported number.

9. The method of claim 8, wherein the sending step comprises:
sending a second signaling message via the interoffice signaling system from the second central office switching system to the first central office switching system indicating said condition requiring forwarding; and
sending the first signaling message from the first central office switching system in response to reception of the second signaling message.

10. The method of claim 9, wherein the first signaling message sending step comprises inserting the ported number in a calling number field of the first signaling message and inserting a telephone number of the voice mail system in a called number field of the first signaling message.

11. The method of claim 1, wherein the first signaling message sending step comprises inserting the ported number in a calling number field of the first signaling message and inserting a telephone number of the voice mail system in a called number field of the first signaling message.

12. The method of claim 1, wherein the first signaling message sending step further comprises outputting the first signaling message from the second central office switching system in response to the detected one condition.

13. The method of claim 1, wherein
the first signaling message specifies the ported number in a calling number field and specifies a multi line hunt group telephone number of the voice mail system in a called number field;
the establishing step comprises coupling a telephone call from the calling party identified by the first signaling message to a link associated with the multi line hunt group telephone number; and
the supplying step comprises transmitting the ported number to the voice mail system across a data link interface according to a protocol that is independent of a predetermined range of provisioned exchange codes assigned to the third central office switching system.

14. A telecommunications network comprising:
- a first central office switching system serving a calling party having input a telephone number for a called party;
- a second central office switching system serving the called party with said telephone number as a ported number;
- a database for providing a network address for the second central office switching system in response to a first signaling message specifying the called party telephone number;
- a voice mail system implementing at least a voice mailbox for the called party;
- a third central office switching system serving the voice mail system, wherein the third central office switching system is coupled for communication with the voice mail system by at least one telephone line and a data link interface having a protocol independent of a predetermined range of provisioned exchange codes assigned to the third central office switching system,
- the third central office switching system receiving a second signaling message including the ported number, and in response, providing communications for the calling party to the voice mail system and supplying the ported number over the data link interface to the voice mail system,
- wherein the voice mail system selectively couples a voice processing unit implementing the voice mailbox of the called party to the communications for the calling party, in response to the ported number.

15. The network of claim 14, wherein the first central office switching system outputs the first signaling message to the database in response to detection of the telephone number as having a predetermined exchange serving at least said ported number.

16. The network of claim 14, wherein the first central office switching system includes portable number forwarding logic configured for generating the second signaling message to the third central office switching system in response to a third signaling message from the second central office switching system indicating an unavailability of the called party at the ported number.

17. The network of claim 16, wherein the second signaling message includes a calling number field and a called number field, the portable number forwarding logic inserting the ported number into a calling number field and a telephone number of the at least one telephone line in the called number field during generation of the second signaling message.

18. The network of claim 14, wherein the second central office switching system includes portable number forwarding logic configured for generating the second signaling message to the third central office switching system in response to a third signaling message from the first central office switching system requesting termination to the called party and a detected unavailability of the called party at the ported number.

19. The network of claim 18, wherein the second signaling message includes a calling number field and a called number field, the portable number forwarding logic inserting the ported number into a calling number field and a telephone number of the voice mail system in the called number field during generation of the second signaling message.

20. The network of claim 14, wherein the data link interface protocol is a Premier Message Service Interface protocol.

21. A method of processing a call through a communication network, the method comprising:
- detecting a call by receiving a ported number from a calling party in a first central office switching system serving the calling party;
- determining a network address of a second central office switching system serving the ported number, based on a translation of the ported number;
- detecting in the second central office switching system a condition relating to the ported number requiring forwarding of the call to a voice mailbox of the called party;
- sending a first signaling message to a third central office switching system including the ported number, the third central office switching system serving a voice mail system implementing the voice mailbox of the called party;
- establishing a communication link for the call through the third central office switching system to the voice mail system;
- supplying the ported number to the voice mail system; and
- providing communication for the call with the voice mailbox for the called party, based on the ported number supplied to the voice mail system.

* * * * *